United States Patent Office 3,533,770
Patented Oct. 13, 1970

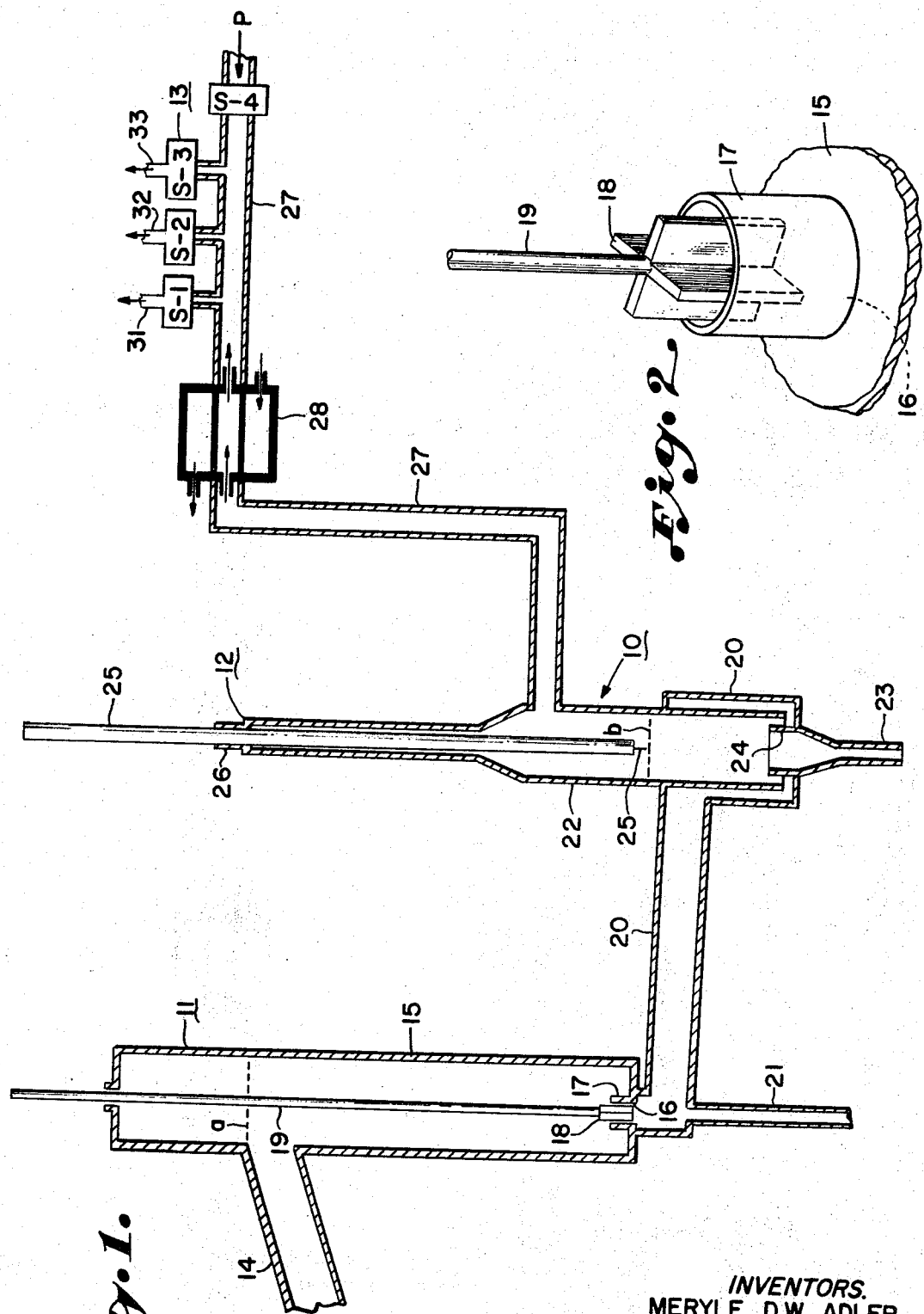

3,533,770
PNEUMATIC FEEDER SYSTEM FOR LOW VISCOSITY MOLTEN GLASS
Meryle D. W. Adler and Carl D. Andrysiak, Painted Post, and Lawrence A. Pauls, Horseheads, N.Y., assignors to Corning Glass Works, Corning, N.Y., a corporation of New York
Filed Aug. 23, 1967, Ser. No. 662,659
Int. Cl. C03b 17/00
U.S. Cl. 65—131                  10 Claims

ABSTRACT OF THE DISCLOSURE

A system for intermittently feeding discrete charges of low viscosity molten glass with desired holding times therebetween, using air pressure and vacuum as the controlling media to repeatably provide improved weight control.

BACKGROUND OF THE INVENTION

Intermittent charges of molten glass are customarily delivered by a gobbing arrangement wherein a vertically movable needle is positioned within a defined well of a feeder. Such an arrangement, however, relies upon the viscous shear force between the needle and the wall of the well to create the discharge gobbing pressures and the degree of upward flow or suck-up which determines the holding time between the various gobs. Due to the fluidity of low viscosity glasses, it is virtually impossible and completely impractical to construct a satisfactory needle and well feeder for intermittently feeding glasses having a viscosity of below 100 poises.

Various attempts have been made in the past to utilize vacuum and pressure to control the intermittent flow of molten glass; however, these have not been entirely satisfactory since they have not been sufficiently responsive to repeatably provide desired weight control. Also the applied vacuum, if not correctly calibrated, had a tendency to either draw air up through the orifice, or allow a portion of the molten glass to drip away as the level of glass in the feeder varied.

It thus has been an object of the invention to provide a system for accurately feeding charges of about .1 to about 1.5 pounds of molten glass having a viscosity below 100 poises, with 3 to 10 seconds delay between the charges.

It has been a further object of the invention to provide a system for repeatably feeding discrete charges of low viscosity glass with an average weight control of about plus or minus 1 percent.

SUMMARY OF THE INVENTION

The pneumatic feeder system of the present invention includes an enclosed chamber utilizing a variable resistance orifice to control the flow of molten glass thereto, and a fixed resistance orifice through which the molten charge is delivered. The chamber is provided with a vacuum and air pressure connection adjacent the top, a fixed resistance delivery orifice adjacent the bottom, and a supply inlet, having an adjustable restriction, which supply is connected with the forehearth of a glass melting tank. In operation, the chamber is partially filled with molten glass, and a vacuum equal to the head of glass is applied thereto during the holding period, which results in atmospheric pressure at the orifice and accordingly no flow. When a charge is desired, a predetermined pressure pulse is applied to the chamber to deliver the desired charge from the fixed resistance delivery orifice. However, in order to obtain rapid response and control the charge weight within about plus or minus 1 percent, the chamber is first subjected to a substantially instantaneous exhaust before a vacuum is again reapplied, so that there is no momentary loss of the applied vacuum and a fast control response is achieved. Accuracy and repeatability of the charges are obtained by programming the vacuum and pressure with accurately timed and responsive valves.

BRIEF DESCRIPTION OF THE DRAWING

FIG. 1 is a schematic elevational view in section of apparatus embodying a preferred pneumatic feeder system.

FIG. 2 is a somewhat enlarged fragmental perspective view of a variable resistance orifice utilized to control the flow of molten glass to a feeder chamber.

DESCRIPTION OF THE PREFERRED EMBODIMENT

The pneumatic feeder system 10 as shown in FIG. 1 includes an inlet portion 11, a delivery portion 12, and a control portion 13. The inlet portion 11 has an inlet conduit 14 for supplying molten glass from a suitable source such as the forehearth of a glass tank to a supply reservoir 15. The supply reservoir is provided at its bottom with a variable resistance flow control orifice 16 formed by an upwardly extending cylindrical flange 17. A cruciform restriction member 18 is movably positioned within the orilce 16 by means of a control rod 19, so as to control the flow of molten glass through the orifice. A connecting tube 20, having a drain tube 21, connects the inlet portion 11 to the delivery portion 12 of the pneumatic feeder system.

The delivery portion 12 includes an accumulator container 22, forming an enclosed delivery zone or chamber, and having a delivery orifice 23 associated with the bottom thereof. A weir 24 is formed around the orifice 23 at the bottom of the accumulator container 22 to deflect incoming glass upward as it enters the container 22 from the connecting tube 20 so as to mix the glass in the container and discourage short circuiting of the glass from the connecting tube 20 to the orifice 23. A glass level probe 25 extends downwardly within the accumulator container 22 through a probe guide opening 26 to measure and monitor the level of glass within the container. Although the glass level $b$ within accumulator container 22 will vary, it should be noted that it is below the glass level $a$ within the supply reservoir 15. A duct 27 communicates between an upper portion of the accumulator 22 and the control portion 13 of the pneumatic feeder system, to periodically supply a controlled pressure or vacuum to the delivery portion 12.

The duct 27 passes through a heat exchanger 28 and communicates with four timer-actuated solenoid control valves S–1, S–2, S–3, S–4. Control valve S–1 is positioned within a pipeline 31 leading to a first source of vacuum. Control valve S–2 is positioned within a pipeline 32 leading to a second source of vacuum. Control valve S–3 is positioned within a pipeline 33 communicating with a rapid exhaust system such as a Pemberthy Model 2A air ejector. Solenoid control valve S–4, on the other hand, communicates with a suitable source of air under pressure to be supplied to the system. The control portion 13 and the probe guide opening 26 are both positioned above the glass line $a$, so that in the event the orifice 23 should become plugged, molten glass will not flow into the control portion, out of the probe guide, or back into the forehearth.

In operation, molten glass is fed to the supply reservoir 15 from a suitable forehearth by means of inlet conduit 14. A fairly constant head of molten glass is maintained in the supply reservoir at a glass level $a$ which approximates the level within the glass tank. Flow control rod 19 is manipulated to vary the insertion of the cruciform restriction member 18 within the cylindrical flange 17 of orifice 16 to produce a desired flow rate through connecting tube 20 to the accumulator container 22. The length of the cruciform member 18 positioned within flange 17 provides a variable resistance to flow through the orifice 16, and accordingly a desired flow rate is provided by vertically positioning the restriction member 18 within flange 17. A drain tube 21 is provided below orifice 16 to drain the system in the event of a failure or shutdown.

Molten glass from connecting tube 20 enters the accumulator container 22 adjacent a lower portion thereof and is deflected upwardly by weir 24 formed about the delivery orifice 23. The upward flow has a tendency to homogenize and mix the glass retained in the accumulator and prevent short circuiting of the glass from the connector tube to the orifice. The probe 25, which may be a suitable Beck level probe, is preferably coated with refractory along its extent, and projects through the probe guide opening 26 at the top of the accumulator 42, to measure the variable glass level $b$ therewithin. In view of the fact that the control system is periodically applying pressurized air to and withdrawing hot air from the accumulator container, it was found desirable to provide a heat exchanger 28 to protect the operating mechanism of solenoid control valves S–1, S–2, S–3, and S–4.

When delivering fairly large charges of glass, an initial vacuum is applied to the accumulator chamber 22 from a first vacuum source through pipeline 31 and duct 27, upon the energization of solenoid control valve S–1. The initial vacuum applied to the chamber is equal to the head of glass therewithin, and accordingly there is no flow at the delivery orifice 23. The previously delivered charge may be shear cut at that time if desired. The initial vacuum is maintained in the accumulator chamber for the duration of the desired holding portion of the cycle. However, molten glass from the supply reservoir will flow into the delivery chamber during the holding period and raise the glass level $b$ therewithin. Accordingly, a second vacuum is applied to the accumulator chamber 22 from a second vacuum source through pipeline 32 and duct 27 upon the deenergization of solenoid control valve S–1 and the energization of solenoid control valve S–2. The new vacuum applied to the chamber is equal to the new head of glass therewithin, again resulting in no flow at the delivery orifice and permitting a shear cut of any tail before charging.

At the end of the desired holding time, solenoid control valve S–2 is de-energized and substantially simultaneously control valve S–4 is energized to apply air at a predetermined pressure from a suitable source through conduit 27 to chamber 22 to deliver a charge of glass from delivery orifice 23. Some glass will flow back into the supply reservoir, and the glass level $b$ within the accummulator 22 will return to its initial glass-holding level. When a predetermined charge weight is delivered, control solenoid valve S–4 is de-energized and control valve S–3 is energized to substantially simultaneously exhaust the pressure from the accumulator to duct 27 and pipeline 33. The exhaust system pulls the accumulator pressure down quickly to the level necessary to support the glass head, and control valve S–3 is then de-energized and control valve S–1 is again reenergized to apply the first vacuum source to the accumulator so as to maintain the desired no flow condition at the orifice. The separate exhaust system has the added advantage of not flooding the first vacuum source with air from the accumulator tank, which would cause a momentary loss of vacuum while the source replenishes its supply. Accordingly the exhaust system provides the requisite substantially instantaneous switching control necessary to achieve feeder weight control within plus or minus about 1 percent.

The solenoid control valves S–1, S–2, S–3, and S–4, which are of any suitable manufacture such as ASCO Bulletin 8215 valves, may be manually energized if desired, or they preferably may be energized by suitable well known timers such as ATC timers, with each timer being set to energize the valves in the desired sequence. Also we found it desirable to utilize filtered air within the system in order to protect the platinum in the system and the operating parts of the exhaust ejector. In order to protect the extremely low viscosity glass utilized in the system from contamination, all plumbing from the flow control orifice to the delivery orifice is preferably of a platinum-rhodium alloy.

With a glass having a viscosity of about 50 poises, gob weights from about 1 ounce to 1 pound may be formed with a ½ inch diameter delivery orifice, whereas gob weights from about 1 to 4 ounces may be formed with a ⅜ inch diameter delivery orifice. Since the hold-back time is a function of the speed of the glass level recovery $b$ within the accumulator, as the glass level must buildup to replace the volume dispensed, the actual hold-back time at the delivery orifice may be increased by increasing the resistance at the control orifice to reduce glass flow to the accumulator. A small charge of about 4 ounces or less, only requires a small buildup of glass for the next charge, and accordingly the utilization of the second vacuum source is not required, since the application of the initial vacuum is sufficient to maintain no flow at the orifice during the buildup period. When dispensing large charges, however, it has been found that the glass has a tendency to form a tail during the buildup in the accumulator, and accordingly the second vacuum is momentarily applied to balance the increased head in the accumulator and permit a shear cut just prior to the application of pressure for dispensing the next charge.

Generally, for a ½" delivery orifice dispensing glass about 50 poise, the initial vacuum will have a value of about 20 inches of water and the second vacuum will have a value of about 22 inches of water. The charge delivery pressure, depending upon the charge and orifice size, may range from about 17½ to 2 p.s.i. Typical settings for small charges, i.e., below 4 ounces, were about 1/10 of a second, whereas typical settings for larger charges were about ½ second.

The following specific examples are given to illustrate the operation of our improved pneumatic feeder system with both the utilization of the second vacuum for a larger charge and the elimination of such vacuum when dispensing discrete smaller charges:

EXAMPLE 1

Vaccum #1—10.37 sec. at 19½" $H_2O$
Vacuum #2—1.5 sec. at 20½" $H_2O$
Pressure—.5 sec. at 10½ p.s.i.
Exhaust—.62 sec.
Charge weight—14 oz.
Orifice size—½" diameter
Viscosity—80 poises

EXAMPLE 2

Vacuum #1—3.95 sec. at 17½" $H_2O$
Vacuum #2—Off
Pressure—.175 sec. at 2 p.s.i.
Exhaust—.2 sec.
Charge weight—1¼ oz.
Orifice size—½" dia.
Viscosity—68 poises Although the system is primarily designed to deliver low viscosity glasses, which could not heretofore be conviently handled by known methods, it will be appreciated that the present invention will also function to deliver glasses up to about 1000 poises. Further, it will be apparent that various changes and modifications may be made to the system, such as by programming the amount of vacuum applied to compensate for the increase in glass level $b$; however, such changes do not depart from the spirit and scope of the invention as defined in the appended claims.

We claim:

1. A method of delivering individual charges of low viscosity molten glass which comprises, metering the flow rate of the low viscosity molten glass from a supply body thereof through a variable resistance orifice to a delivery zone, applying pneumatic pressure to the entire surface of the molten glass within such zone to deliver a discrete charge of molten glass, rapidly exhausting the delivery pressure from said zone above the glass surface, and then applying a vacuum thereto substantially equal to a head of glass retained therein to maintain the glass therewithin and prevent further delivery flow therefrom during a hold-back period.

2. A method of delivering low viscosity molten glass as defined in claim 1 further including the step of applying a second vacuum of greater magnitude than said first-mentioned vacuum to said delivery zone as the glass rises therewithin, to compensate for the changing glass level and maintain no flow during the holdback period.

3. A method of delivering low viscosity molten glass as defined in claim 1 further including the steps of proportionately increasing said vacuum as the level of glass within said zone increases to prevent flow therefrom.

4. A method of delivering low viscosity molten glass as defined in claim 1 wherein said step of applying pneumatic pressure includes utilizing pressurized filtered air.

5. Apparatus for periodically delivering individual discrete charges of low viscoscity molten glass which comprises, a supply reservoir, an accumulator container having a delivery orifice formed in the bottom thereof, tubular means connecting said supply reservoir and said accumulator container for delivering molten glass from said reservoir to said container, means for supplying pneumatic pressure to the entire surface of the molten glass in said container to discharge a discrete charge of molten glass from said delivery orifice, means for exhausting said pressure from said container above the glass level contained therein, and separate means communicating with said container above the glass level for applying a vacuum to said container and prevent flow from the delivery orifice during a hold-back period.

6. Apparatus as defined in claim 5 wherein variable resistant orifice means communicating with said tubular means is provided for controlling the rate of flow of molten glass from said reservoir to said container.

7. Apparatus as defined in claim 6 wherein said variable resistance orifice means includes a vertically movable cruciform restriction member variable positioned within a cylindrical flange portion formed adjacent the bottom of said supply reservoir to control the flow rate of molten glass from said reservoir to said accumulator container.

8. Apparatus as defined in claim 5 including a flange portion surrounding said delivery orifice and extending upwardly into said accumulator container to deflect glass upwardly within the accumulator container and avoid short circuiting of the glass to the delivery orifice.

9. Apparatus as defined in claim 5 including separate means communicating with said accumulator container above the glass level therein for providing a second vacuum to said container and compensating for an increase in such glass level.

10. Apparatus as defined in claim 5 including duct means communicate between said accumulator container and said supplying, exhausting, and applying means, and heat exchanger means on said duct means for cooling the air removed from said container.

References Cited

UNITED STATES PATENTS

| | | | |
|---|---|---|---|
| 1,796,929 | 3/1931 | Howard | 65—130 |
| 2,772,691 | 12/1956 | Hoffman | 138—45 XR |
| 3,186,817 | 6/1965 | Novack | 65—130 |

S. LEON BASHORE, Primary Examiner

J. B. HARDAWAY, Assistant Examiner

U.S. Cl. X.R.

65—329